United States Patent

[11] 3,568,776

[72] Inventor Charles J. Vassberg
 Rte 1, Box 201, Lyford, Tex. 78569
[21] Appl. No. 739,247
[22] Filed June 24, 1968
[45] Patented Mar. 9, 1971
 Continuation-in-part of application Ser. No. 621,938, Mar. 9, 1967, Patent No. 3,509,945

[54] CHASSIS FOR FARM IMPLEMENTS
 5 Claims, 9 Drawing Figs.
[52] U.S. Cl. .................................................. 172/285,
 172/281, 172/286, 172/499
[51] Int. Cl. .................................................. A01b 69/08
[50] Field of Search ........................................... 172/285,
 589, 590, 320, 324, 677, 776, 281, 282, 240, 286,
 291, 584, 500

[56] References Cited
UNITED STATES PATENTS
| 437,666 | 9/1890 | Sobey | 172/285 |
| 2,322,342 | 6/1943 | Bunn | 172/285X |
| 2,675,749 | 4/1954 | Pursche | 172/324X |
| 3,061,020 | 10/1962 | Mannheim | 172/285 |

FOREIGN PATENTS
| 1,111,901 | 5/1968 | Great Britain | 172/285 |

Primary Examiner—Robert E. Pulfrey
Assistant Examiner—C. Coughenour
Attorney—Schmidt, Johnson, Hovey & Williams ABSTRACT: A farm implement having a first beam provided with a hitch including a universal joint and being slidable along a tow bar with the joint directly over the bar to insure sliding without binding during turning of the implement. A second beam is pivoted to the first beam for swinging between two operating conditions extending in opposite directions at an angle from the path of travel of the implement. The rear end of the second beam is supported by a steerable wheel assembly and the front end of the beam is provided with a depth gauge wheel which is automatically moved into either of a pair of corresponding operating positions responsive to said swinging of said second beam to said respective conditions.

PATENTED MAR 9 1971
3,568,776
SHEET 1 OF 2
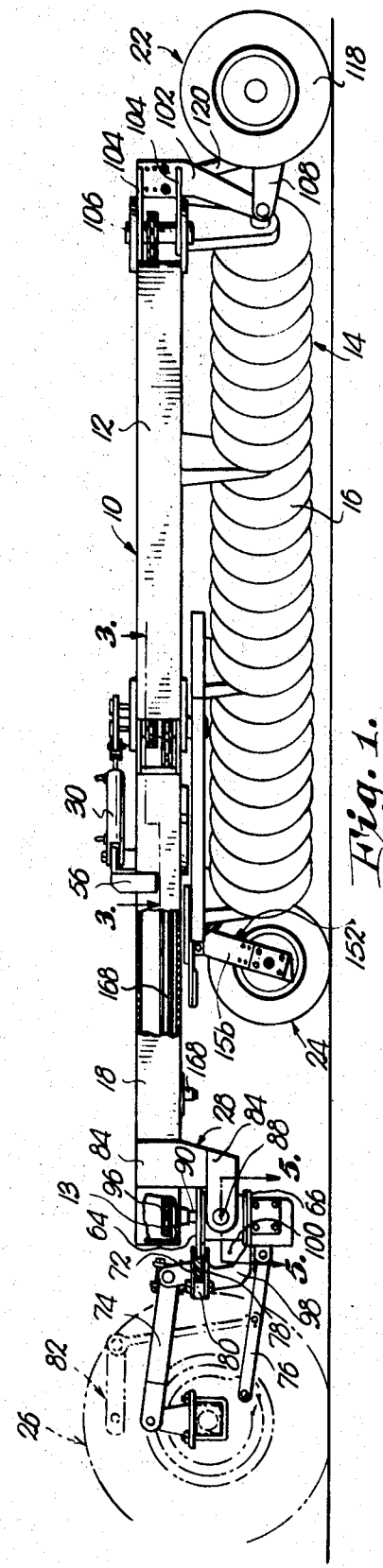
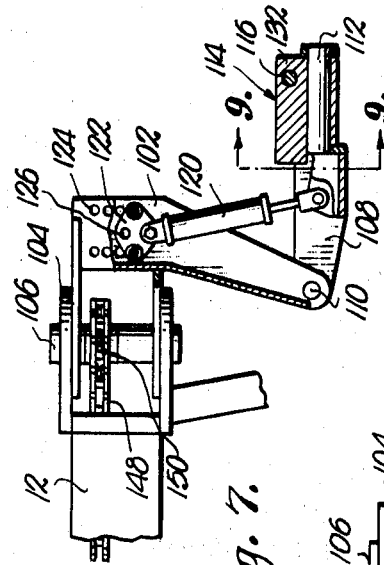
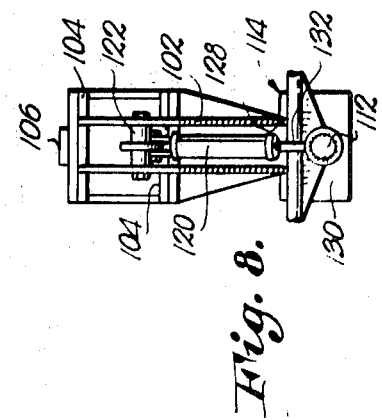
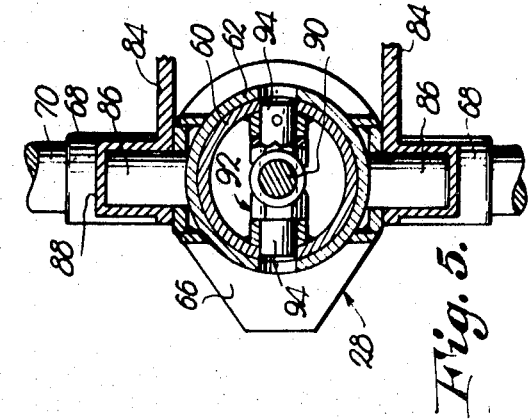
INVENTOR
Charles J. Vassberg
BY Schmidt, Johnson, Hovey,
Williams & Bradley
ATTORNEYS PATENTED MAR 9 1971
3,568,776
SHEET 2 OF 2
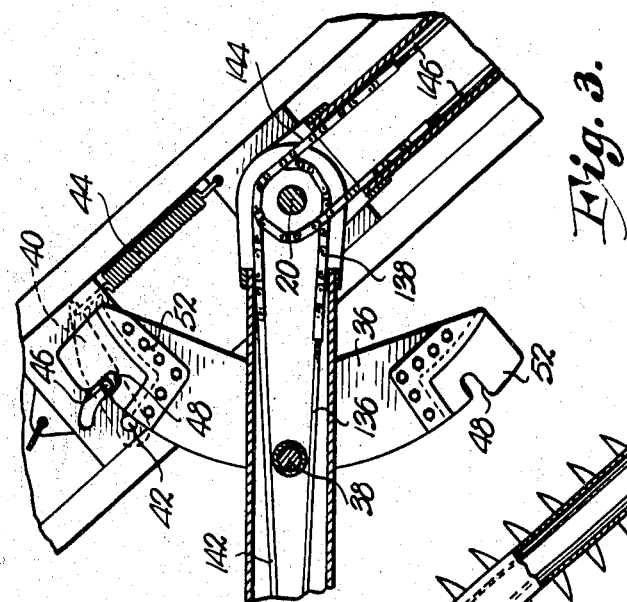
Fig. 3.
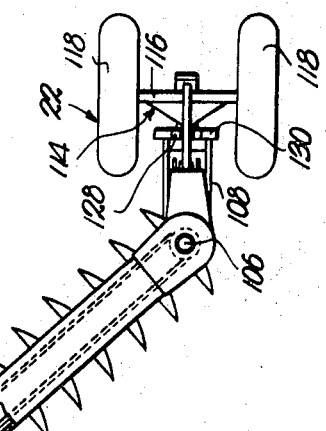
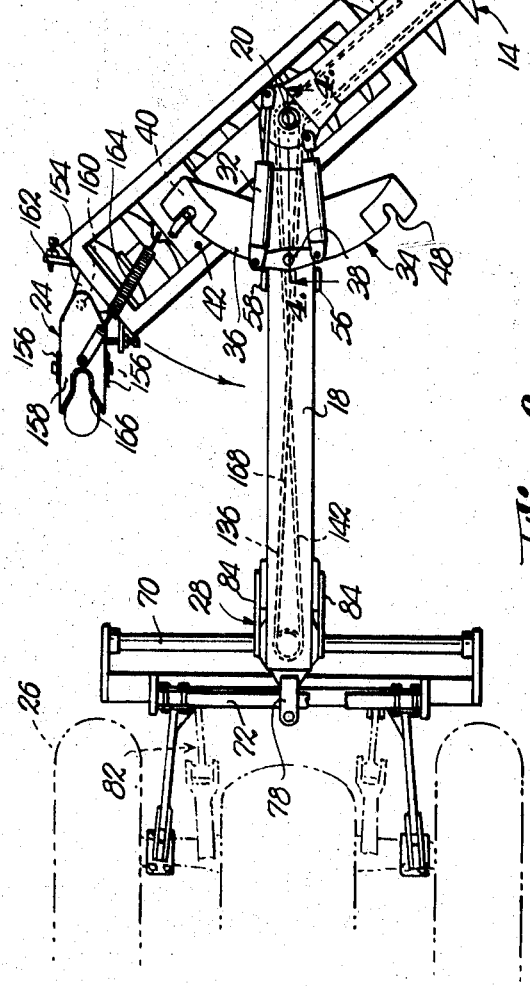
Fig. 2.
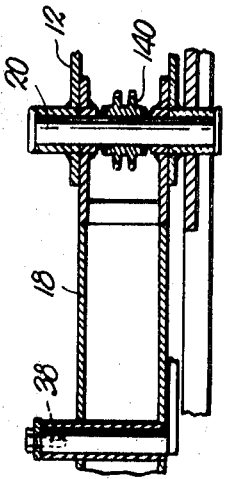
Fig. 4.
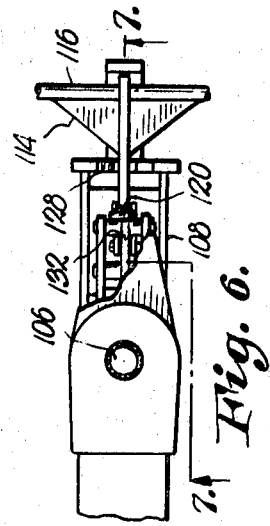
Fig. 6.
INVENTOR
Charles J. Vassberg
BY Schmidt, Johnson, Hovey,
Williams & Bradley
ATTORNEYS

CHASSIS FOR FARM IMPLEMENTS

CROSS REFERENCES

This is a continuation-in-part of my copending application Ser. No. 621,938, filed Mar. 9, 1967, now Pat. No. 3,509,945 granted May 5, 1970, and entitled "Support Framework for Farm Implements."

This invention relates to farm implements, and more particularly, to a framework for supporting a gang of tillage implements in the nature of a one-way plow.

My copending application, Ser. No. 621,938, describes and claims a farm implement having a support framework whose articulated beams are arranged in a general manner to permit the implement-carrying beam to be extended laterally at an angle in opposite directions, rendering the implement especially useful when used as a two-way plow. It is the primary object of this invention to provide an implement of this type having certain improved or additional features, without detracting in any way from the advantageous teachings of that application.

Accordingly, it is ann important object of this invention to provide a modified hitch and tow bar construction for eliminating any tendency for binding of these components during operation and to thereby enhance the ease with which the direction of extension of this implement may be reversed.

It is another very important object of the invention to provide a gauge wheel for supporting one end of the implement-carrying beam, which gauge wheel is automatically shifted to a corresponding proper operating position each time the direction of extension of the beam is changed.

Still another important object of the present invention is to provide an improved dual wheel support for the rearmost end of the main beam to accurately gauge the depth of operation of the implement and constructed for tilting so that wheels are properly positioned with respect to the furrow for supporting the implement regardless of which lateral direction the beam extends.

These and other important objects of this invention will be further explained or will be apparent from the following specification and claims and from the drawing.

In the drawing:

FIG. 1 is a side elevational view of a support framework embodying the principles of this invention, parts being broken away and appearing in cross section to reveal details of construction;

FIG. 2 is a top plan view thereof;

FIG. 3 is an enlarged, fragmentary, cross-sectional view taken on line 3–3 of FIG. 1;

FIG. 4 is a fragmentary, enlarged, vertical cross-sectional view taken along line 4–4 of FIG. 2;

FIG. 5 is a fragmentary, enlarged, cross-sectional view taken along line 5–5 of FIG. 1;

FIG. 6 is a fragmentary enlarged, top plan view of the rear support wheel structure, parts being broken away to reveal details of construction;

FIG. 7 is a fragmentary, cross-sectional view taken along line 7–7 of FIG. 6;

FIG. 8 is a fragmentary, enlarged, rear elevational view of the rear support wheel structure, the wheels being omitted for clearness; and FIG. 9 is a fragmentary, cross-sectional view taken along line 9–9 of FIG. 7.

Framework 10 illustrated in the drawings is particularly adapted for use as a one-way plow and accordingly has one of its beams 12 disposed to carry an implement 14 which comprises a gang of discs 16. The other beam 18 of structure 10 is pivotally coupled to beam 12 and is adapted to be coupled with a towing vehicle such as a tractor or the like. The pivotal interconnection of beams 12 and 18 is accomplished by pivot means 20 which presents an upright axis between the beams.

The beam 12 is supported at its rearmost end by a wheel and axle assembly 22 and the foremost end of beam 12 is supported during operation of the plow by a wheel and axle assembly 24. The forwardmost end of beam 18 is supported by a tractor 26 by means of a hitch broadly designated by the numeral 28. During over-the-road travel the beam 12 is swung about the pivot 20 to a position trailing the beam 18 in alignment with the latter and at that time also the wheel assembly 22 trails the beam 12 in alignment therewith. The wheel assembly 24 is carried by beam 12 in a elevated position during such over-the-road travel and, therefore, not in supporting engagement with the ground.

On the other hand, when the implement 14 is used for tillage purposes, the beam 12 extends laterally from beam 18 at an angle to the normal path of travel of the tractor, either as illustrated in FIG. 2 or with the beam 12 swung to a position extending oppositely from the beam 18. Swinging of the beam 12 is carried out by a pair of piston and cylinder assemblies 30 and 32, and the beam 12 is held in the selected operating position by a releasable latch unit 34.

Latch unit 34 includes a cam plate 36 rigid to a vertical pin 38 which is, in turn, rotatable in beam 18. Beam 12 carried a swingable locking arm 40 which swings about a pivot 42. Arm 40 is yieldably held in the position illustrated in phantom in FIG. 3 by a spring 44. A locking pin 46 engages in either of a pair of notches 48 or 50 in the arcuate edge of the cam plate 36. To this end, plate 36 is provided with a pair of removable notch members 52 to permit replacement by other identical members or by similar members which differ from the members 52 only in the relative position of the respective notches 48 in relationship to pivot pin 38. This, of course, permits replacement when the members become worn. It also makes possible the selective varying of the angularity of beam 12 with respect to beam 18.

An elongated arm 54 is rigidly secured intermediate its ends to pin 38. The piston and cylinder assemblies 30 and 32 are pivotally connected at respective ends of arm 54 and they are also pivotally connected with the beam 12 on opposite sides of the vertical pivot 20 between the beams 12 and 18 as is illustrated in FIG. 2 of the drawings. Rigid, upright stop members 56 and 58 are welded to the corresponding sides of beam 18 in position to permit limited swinging movement of arm 54 with respect to beam 18. The stops 56 and 58 restrict the extent of swinging movement of arm 54 as is apparent particularly in FIG. 2.

Hitch 28 includes a pair of relatively rotatable, interconnected elements 60 and 62 having a common upright axis of rotation and being in the nature of cylinders. The inner cylinder 60 has its top and bottom covered by plates 64 and 66. The bottom plate 66 is rigidly secured to a sleeve 68 (FIG. 5) which slidingly receives a relatively large, transversely circular tow bar 70 which extends transversely across the rear of tractor 26 and across the normal path of travel of implement 14.

Tow bar 70 and a parallel, transversely rectangular bar 72 are carried by generally parallel extending links 74 and 76 which are secured to tractor 26 as illustrated in FIGS. 1 and 2 of the drawings. The upper plate 64 of the inner cylinder 60 is rigidly secured to a forwardly extending clevis 78 having a roller 80 at the front end thereof so that hitch 28 may slide longitudinally along bars 70 and 72 without any tendency for binding.

Parallel links 74 and 76 are adapted to be coupled with the three print linkage of the power lift 82 of tractor 26. It should be noted that sleeve 68 is positioned directly beneath the axis of rotation of the cylinders 60 and 62. The coupling which forms a part of the hitch 28 also includes a yoke 84 rigid to the beam 18 and having its legs embracing the outer cylinder 62 as seen in FIGS. 1, 2 and 5. A pair of opposed pintles 86 connect the yoke 84 with the cylinder 62 for swinging movement of beam 18 relative to tractor 26 about the common horizontal axis of pintles 86. It should be noted that yoke 84 is provided with an integral cup 88 projecting outwardly from each side of the yoke 84 in disposition to receiver the pintles 86 as is clearly illustrated in FIG. 5.

An upright shaft 90 has a universal joint 92 within cylinder 60 and connected with the latter by opposed trunnions 94 so that the shaft 90 rotates with the cylinder 60 in response to turning movement by the tractor 26. The common receive of trunnions 94 of the universal joint 92 is always in a common cross-sectional plane through cylinders 60 and 62 in which the common axis of pintles 86 rotate around the upright axis of cylinders 60 and 62 as tractor 26 turns. This permits yoke 84 to swing about pintles 86, regardless of the angle of beam 18 with respect to the rods 70 and 72. Since the shaft 90 must swing therewith, a clearance opening (not shown) for the shaft 90 is provided in the uppermost plate 64.

Shaft extends into beam 18 and is journaled therein. It has a sprocket 96 rigid therewith and housed in beam 18 as illustrated in FIG. 1. Since tow bar 70 is beneath yoke 84, and the upright arms which interconnect bars 70 and 72 are inclined forwardly and are relieved with a notch 100 in the rearmost edges thereof, yoke 84 clears arms 98 permitting essentially a 90° turn of beam 18 relative to the direction of travel of tractor 26.

The wheel assembly 22 includes an arm 102 which extend downwardly from the rear of beam 12. Arm 102 is carried by horizontally extending brackets 104 which are pivotally coupled to beam 12 by pin means 106 for pivoting of arm 102 about an upright axis. A rearwardly extending bracket 108 is pivotally coupled by a pin 110 to the lowermost end of arm 102 includes a generally horizontally disposed, normally fore-and-aft extending shaft 112. Support structure 114 is pivotally carried by shaft 112 and includes an axle 116 extending transversely to shaft 112. A wheel 118 is disposed at each end of axle 116.

Bracket 108 is coupled with arm 102 remote from pivot pin 110 by a hydraulic piston and cylinder assembly 120. The uppermost end of cylinder 120 is secured to arm 102 by a bracket 122 which may be bolted in any of a series of pairs of holes 124 in arm 102. It should be pointed out that the bracket 122 is provided with holes alignable with the holes 124 and the holes of bracket 122 are offset from the axis of symmetry of the latter. An alternate coupling hole 126 may be utilized for securing the upper end of assembly 120 with bracket 122 upon reversal of the latter, whereby to increase the available dispositions which may be available for the mounting of the uppermost end of assembly 120.

Manifestly, assembly 120 is utilized for swinging bracket 108 with respect to arm 102 to raise or lower the wheels 118. The latter may freely tip about the axis afforded by axis shaft 112 within limits defined by the V-shaped notch 128 in the upper edge of a transversely extending plate 130 forming a part of structure 114. A fore-and-aft extending bar 132 overlying shaft 112 extends through notch 128. Thus, the edges of notch 128 are disposed to engage bar 132 to limit the swinging of assembly 22 about shaft 112. A section of chain 134 is disposed around sprocket 96 within beam 18 and one end of chain 134 is secured to a rod 136. The other end of rod 136 is secured to one end of another chain segment 138 which is in turn, trained around a double sprocket 140 mounted on pivot pin 20 as illustrated in FIG. 3. The other end of segment 138 is secured to the ends of a pair of parallel, spaced-apart straps 142 which extend forwardly within beam 18 and are secured to the other end of chain segment 134. Rod 136 is received between the spaced-apart straps 142 in crossed relationship so that rotation of sprocket 96 by shaft 90 during turning of tractor 26, imparts a corresponding and oppositely directed rotation of sprocket 140.

Another chain 144 is trained around the other portion of sprocket 140 and is secured to a pair of elongated rods 146. Rods 146 are, in turn, secured to the respective ends of a chain 148 (FIG. 7) which is trained around a sprocket 150 rigidly secured to pin 106 which is in turn, journaled in beam 12 and rigidly secured to brackets 104. When the implement is placed in tow by the tractor 26, one wheel 118 will ride in the furrow by virtue of the disposition of the pin means 106 properly placed behind the rearmost disc 16. The other wheel 118 rides upon the untilled ground and the limited tilting permitted of axle 116 compensates for the fact that the wheel 118 which follows the furrow of rearmost disc 16 is lower than the other wheel 118.

Furthermore, such turning movement on the part of tractor 26 is transmitted to the shaft 90 from the rods 70 and 72, i.e., through the sleeve 68 and clevis 78, the plates 64 and 66, and the inner cylinder 60. As a consequence of such rotation of shaft 90 and, therefore, the sprocket 96, the chains and rods or straps are moved to impart a swinging movement in arm 102 which corresponds with the rotation of shaft 90. That is to say, the arm 102 and bracket 108 remain parallel to the beam 18 as long as the rods 70 and 72 are perpendicular to the beam 18 as shown in FIG. 2. However, any angular displacement or rods 70 and 72 in either direction out of perpendicular relationship to beam 19 will produce an angular displacement (opposite in rotation) of arm 102 and bracket 108 with respect to beam 18, i.e., arm 102 and bracket 108 are not parallel to beam 18 during turning.

The front wheel and axle assembly for beam 12 includes a support 152 which is pivotally coupled to a forwardly projecting bracket 154 rigidly secured to the forward end of beam 12. Support 152 comprises a pair of spaced-apart, generally upright legs 156 which are secured adjacent their uppermost ends to an elongated member 158 which is pivoted at one end thereof by means 160 to bracket 154. A pair of adjustable stops 162 are rigidly secured to beam 12 in dispositions as illustrated best in FIG. 2 and are disposed to engage either side of member 158 at the extreme limits of swinging of the latter about bracket 154. An elongated spring 164 is pivotally coupled to member 158 in forwardly spaced relationship from pivot means 160. The other end of spring 164 is secured to beam 12 in spaced relationship rearwardly of the pivot means 160 whereby the spring 164 and member 158, together with bracket 154 and pivot means 160, comprise overcenter mechanism in the nature of a toggle for assembly 24. The forward end of member 158 is presented with an irregular notch 166 having an edge which is engageable with a roller 168 carried beneath beam 18 in rearwardly spaced relationship from hitch 28 as illustrated best in FIG. 1.

When it is desired to change the angular relationship of beam 12 to the beam 18, power means 30—32 is actuated. This swings arm 54, pin 38 and plate 36 to respect to beam 18 a sufficient distance to withdraw the notch of plate 36 from engagement with locking pin 46 of locking arm 40. Continued rotation of the assembly brings arm 54 into engagement with stop member 56 so that continued operation of cylinder assemblies 30 and 32 swings beam 12 about the vertical axis afforded by pin means 20. The locking pin 46 slides along the arcuate edge of plate 36 until it is received in the other notch 48 corresponding with the opposite position of beam 12 as will be readily understood by those skilled in this art.

It will be appreciated that the implement is raised from the tilling position for implement 14 prior to the swinging of beam 12. This is, of course, effected by operation of cylinder assembly 120 in conjunction with the lifting of the forwardmost end of the implement by the power lift of tractor 26. This raises wheel and axle assembly 24 of the ground since the assembly 24 is provided primarily as a depth gauge wheel to support the forward end of beam 12 during the tillage operation.

During swinging of beam 12 with respect to beam 18, the notch 166 of member 158 is brought into engagement with roller 168. The latter rolls along the notched edge during such swinging and imparts a temporary holding action to the forward end of member 158 and sufficient to pivot the latter about pivot means 160. This swinging of member 158 is accomplished after the overcoming of the bias of spring 164 which normally holds the member 158 into engagement with the proximal stop 162.

As soon as the swinging of the beam 12 with respect to the beam 18 has proceeded beyond a given point, defined by the geometrical construction of the components, the overcenter toggle construction of the support structure for wheel and axle assembly 24 permits the latter to be shifted to its opposite position. Member 158 is held in this position against the other stop 162 by the spring 164. Manifestly, this other position for assembly 24 corresponds with the line of draft of the implement when beam 12 is in its opposite, laterally extending position from that shown in FIG. 2.

During the swinging of beam 12 and by virtue of the sprocket 96 remaining stationary, the wheel assembly 22 is caused to automatically swing to the new proper position by the action of the chains, rods and shapes on arm 102. It can also now be appreciated that for over-the-road travel, the power means 30 and 32 may be operated to place the beam 12 and the assembly 22 in aligned trailing relationship to the beam 18.

The disposition of the sleeve 68 for rod 70 immediately beneath the axis of swinging of cylinders 60 and 62 places rod 70 also in direct parallel relationship to pintles 86. This eliminates tendency for binding of sleeve 68 to bar 70 during articulation of the structure 10. This elimination of any tendency for binding is also enhanced by the construction of the clevis 78 and roller 80 which operate with the parallel bar 72.

It should be noted that the links 74 and 76 and their associated pivot points connecting them with the structure 10 and tractor 26 respectively, define substantially parallel linkage. Thus, the universal joint 92 is kept in substantial parallelism with a vertical axis through tractor 26 throughout the lifting of the forward end of structure 10 by the tractor power lift. This tends to keep the horizontal plane through the plow essentially parallel to a horizontal plane through the tractor in a turn providing, of course, that the tractor and plow are both on essentially level ground.

I claim:

1. In a support framework for farm implements, a pair of elongated, substantially horizontal beams;
    pivot means interconnecting the beams for swinging movement of one of the beams about an upright axis to preselected operating conditions extending laterally at an angle in either of two opposite directions from the other beam;
    a wheel and axle assembly;
    a support for said wheel and axle assembly; and
    means including an overcenter toggle mechanism between the support and said one beam pivotally attaching the support to said one beam for movement of the assembly between a pair of different positions, there being a position corresponding to each respective condition of said one beam said attaching means including means yieldably holding the assembly in either of said positions.

2. The invention of claim 1, wherein said support includes an elongated member pivotally coupled at one end thereof to said one beam for swinging movement about an upright axis, said yieldable means being secured to the beam and to said member.

3. The invention of claim 4, wherein is included a pair of spaced-apart stop elements engageable by the member and carried by said one beam for limiting the swinging of the member with respect thereto, each stop being disposed to limit the assembly in a respective one of said positions.

4. For use with a towing vehicle having a pair of rear wheels and with a farm implement having a line of draft angularly offset to the normal path of travel of the implement when towed by said vehicle, a hitch comprising:
    an elongated, normally horizontal tow bar adapted for attachment to said vehicle behind said wheels in perpendicular relationship to said path of travel;
    a coupling adapted for attachment to said implement and provided with upright pivot means about which the implement swings relative to said vehicle during turning of the latter,
    said coupling being disposed in overlying relationship to said tow bar and being freely reciprocable along the tow bar longitudinally of the latter, whereby to automatically maintain said line of draft in a position passing through a point substantially centered between said wheels during towing of the implement by the vehicle; and
    means for supporting said implement remotely from said coupling, said supporting means including a shaft, a pair of wheels mounted on the shaft, means pivotally mounting the shaft on the implement for rocking movement about a generally fore and aft axis and for swinging movement about an upright axis, and means engageable with said mounting means for limiting the extent of said rocking movement.

5. A support framework for a farm implement comprising:
    a pair of elongated, substantially horizontal beams;
    pivot means interconnecting the beams for swinging movement of one of the beams about an upright axis to preselected operating conditions extending laterally at an angle in either of two opposite directions from the other beam;
    hitch means at one end of said other beam adapting the same for attachment to a towing vehicle capable of lifting said one end of said other beam;
    wheel means pivotally secured to the end of said one beam remote from said vehicle for supporting the one beam;
    power means operably coupled to said wheel means and to said one beam for selectively raising and lowering the latter; and
    a gauge wheel secured to the end of said one beam remote from said wheel means and operable to support said other end in predetermined vertically spaced relationship from the ground when the one beam is lowered by said power means, said gauge wheel being disposed to clear the ground when the one beam is in its raised position.